United States Patent [19]

Jenekhe et al.

[11] Patent Number: 4,568,482

[45] Date of Patent: Feb. 4, 1986

[54] PROCESS FOR MAKING ELECTRICALLY CONDUCTING POLYMERS AND POLYMERS MADE BY SUCH PROCESS

[75] Inventors: Samson A. Jenekhe, Bloomington; Barbara J. Fure, Edina, both of Minn.

[73] Assignee: Honeywell Inc., Minneapolis, Minn.

[21] Appl. No.: 505,202

[22] Filed: Aug. 23, 1983

[51] Int. Cl.[4] .............................................. H01B 1/00
[52] U.S. Cl. ..................... 252/500; 524/80; 528/423; 528/490; 528/503
[58] Field of Search ....................... 252/500, 512, 518; 524/80; 528/423, 490, 503, 502

[56] References Cited

U.S. PATENT DOCUMENTS

| 4,204,216 | 5/1980 | Heeger et al. | 357/8 |
| 4,222,903 | 9/1980 | Heeger et al. | 252/518 |
| 4,304,719 | 12/1981 | Wynne et al. | 260/314.5 |
| 4,452,725 | 6/1984 | Wellinghoff et al. | 252/500 |

FOREIGN PATENT DOCUMENTS 165520  12/1979  Japan .

OTHER PUBLICATIONS

"Conducting Polymers R&D Continues to Grow", C&EN, Apr. 1982 (29–33).
Shacklette et al., "Solid State Synthesis of Highly Conductive Polyphenylene from Crystalline Oligomers", J. Chem. Phys. vol. 73, 4098–4102 (1980).

*Primary Examiner*—Josephine L. Barr
*Attorney, Agent, or Firm*—Charles G. Mersereau

[57] ABSTRACT

A one-step process for synthesizing electrically conducting polymers of iodine doped poly N-alkylcarbazoles is disclosed together with the conducting polymers made by the process.

13 Claims, No Drawings

PROCESS FOR MAKING ELECTRICALLY CONDUCTING POLYMERS AND POLYMERS MADE BY SUCH PROCESS

BACKGROUND OF THE INVENTION

1. Field of the Invention

The present invention relates to electrically conducting organic polymers and, more particularly, a one-step chemical method of making charge-transfer acceptor doped poly N-alkylcarbazoles together with the resulting new conducting polymeric organic semiconductors.

2. Description of the Prior Art

High molecular weight organic polymer materials are generally non-conductive because they do not have free electrons like metals. It has been found, however, that certain high molecular weight materials having intrinsic double bond structures such as polyacetylene, polythiazine and polypyrrole may become highly conductive when doped with certain electron acceptors or donors. These compounds have proved to be of a great deal of interest inasmuch as they may combine some of the traditional properties of organic polymers such as high strength, light weight, flexibility and low temperature processing together with selective electrical properties including high electrical conductivity. In addition, their cost is relatively low.

Such materials undoubtedly will have an important impact on many areas of technology, especially the electronics industry. For example, experimental batteries made from conducting polymers have been shown to exceed current power sources in both power and energy densities. Other areas of potential applications include chemical or gas sensors, low cost, large area optical sensors, switches, light weight electrical connections, wire, and in their film form for many types of microelectronic circuits and large area solar cells.

Thus, organic materials that behave as metals or semiconductors will provide the advantages of these materials together with additional advantages of being soluble in organic solvents or having low melting points and glass transition temperatures which both minimize the cost of processing and permit composites to be made with thermally sensitive materials such as doped Si or GaAs, for example. The enormous molecular design flexibility of organic chemistry enables precise tailoring of properties to fill a wide range of applications as enumerated above. In addition, the high strength and conductivity-to-weight ratios lend the advantage of fabrication of many electrical devices of much lower weight than conventional materials.

In the prior art, a large number of polymeric conductors have been made. These include polyacetylene and its analogues which may be doped with $I_2$, $AsF_5$ and $BF_4^-$ or the like. In addition, various phenylene polymers and phthalocyanine complexes have been synthesized as conductive materials.

Highly conducting p-type materials have been obtained by doping the polymer with a charged transfer acceptor such as $I_2$ or $AsF_5$ from the gas or with $ClO_4^-$ or $BF_4^-$ by electrochemical oxidation. An n-type material has been achieved by a doping with alkali metal. In known cases of these two types of materials, however, to date only the p-type show any environmental stability.

Theoretically, conductivity takes place both along the polymer chain and between adjacent chains. The active charge carrier, at least in the aromatic materials, is believed to be a bipolaron that is delocalized over several monomer units. The mobility of such a species along the polymer chain is reduced by conformational disorder, necessitating a rigid highly crystalline chain structure for maximum intrachain conductivity. Various mechanisms such as "hopping" and "interchain exchange" are thought to be responsible for the interchain part of the conductivity. Unfortunately all of the most highly crystalline polymers of high conductivity are insoluble and infusable. Such is the case with the most common prior art conducting polymer, polyacetylene, which because of this, must be used in the same form as polymerized. In film form it becomes highly porous fibrillar networks which are tough, cheap, and can be electrochemically doped very rapidly. Polyacetylene films have been used in light weight storage batteries and can also be used to make Schottky barriers which exhibit a photovoltaic effect.

Successful environmentally stable doped conducting polymers are described in two co-pending applications, the first, U.S. Pat. No. 4,452,725 to S. T. Wellinghoff, S. A. Jenekhe (an inventor in the present application) and T. T. Kedrowski concerns conducting polymers of N-alkyl 3,3'carbazolyl chemically doped with charge transfer acceptor dopants such as the halogens. The second, Ser. No. 525,763 to S. A. Jenekhe (an inventor in the present invention) S. T. Wellinghoff and Y. A. Chen filed of even date herewith concerns complexes of poly (N-alkyl phenothiazine) doped with charge transfer acceptors.

In the prior art electrochemical synthesis of electrically conducting polymers the requisite monomers and dopants are dissolved in a solvent and the resulting solutions are electrolyzed by application of electrical power. Doped electrically conducting polypyrrole, polythiophene, polyazulene, polypyrene, and others have been successfully prepared by electrolysis of solutions of their monomers with such dopant species as $ClO_4^-$, $BF_4^-$, $PF_6^-$, etc. Simultaneous polymerization and doping take place, thus producing the doped conducting polymer in one step. However, compared to chemical synthesis far fewer conducting polymers are available by electrochemical synthesis.

In the prior art chemical synthesis of electrically conducting polymers two distinct steps are usually required. First, the base polymer in the form of powder, pellet, or film is produced by polymerization of the appropriate monomer. Where the polymer film is desired and is not produced directly during polymerization, the powder or pellet or whatever prior form may also require processing into a film as an intermediate step. Second, the base polymer film, powder, or other form is chemically or electrochemically doped by exposing and contacting the virgin polymer with suitable dopant in the vapor or liquid phase. This prior art two-step method of making electrically conducting polymers is exemplified in the preparation of doped p-type or n-type polyacetylene films as described by A. J. Heeger et al in U.S. Pat. Nos. 4,204,216 and 4,222,903 (1980). Likewise the prior preparation of many other doped conducting polymer complexes such as those based on poly p-phenylene, poly phenylene sulfide, metal-phthalocyanines, polyquinolines, etc., follows the two-step chemical synthesis procedure.

In the prior art two-step method of synthesizing doped conducting polymers uniformity of doping in the base solid polymer has been difficult to achieve. Nonuniformity of doping and inherently low rates of doping are so partly because of their dependence on the diffusivity of the doping species, the physical form, density, surface area; molecular structure, and crystallinity of the starting base polymer. The chemical doping step may also produce undesired chemical transformations in the starting backbone polymer structure, such as crosslinking, to the extent of precluding further processibility of the doped conducting polymer.

One attempt by L. W. Shacklette et al (J.Chem.Phys. 73, 4098 (1980)) to achieve a one-step method of chemical synthesis of doped conducting polymers consisted in the solid-state polymerization and doping of para-phenylene oligomers which have a degree of polymerization from 2 to 6, i.e., biphenyl, para-terphenyl, para-quarterphenyl, etc., by arsenic pentafluoride AsF$_5$ vapor. However, the monomer, para-phenylene, does not polymerize with AsF$_5$. Thus, this is still more or less a two-step method in which first the oligomers are produced from the monomer and secondly the oligomers are further polymerized and simultaneously doped with AsF$_5$ to yield a doped conducting poly p-phenylene.

SUMMARY OF THE INVENTION

The present invention provides a one-step method for the chemical synthesis of iodine-doped electrically conducting polymers in the class of poly N-alkylcarbazoles and which exhibit electrical conductivity in the range characteristic of semiconductors. The method consists in combining two previously separate chemical synthesis steps, the polymerization of monomers to high molecular weight materials and the chemical doping with a charge-transfer acceptor dopant, into one to yield doped conducting polymer products. The method has been used to prepare a series of iodine-doped poly N-alkylcarbazoles semiconductors.

In accordance with the present invention it has been found that certain monomers can be simultaneously polymerized and doped by iodine. Synthesis of iodine-doped polymer complexes from N-alkylcarbazole and N-alkydihalocarbazole monomers with the general formulas:

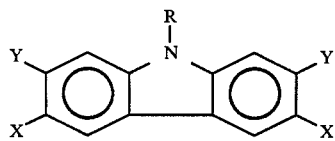

I where R is H, CH$_3$, or C$_2$H$_5$, X and H and both X's are Br or I or Y is H and both X's are Br or I can be achieved by simultaneous polymerization and doping in liquid iodine. H or Br or I, can be achieved by simultaneous polymerization and doping in liquid iodine.

In accordance with the present invention new highly conducting, environmentally stable, iodine-dope polymers with the structures,

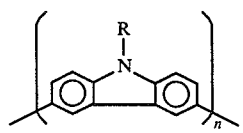

II

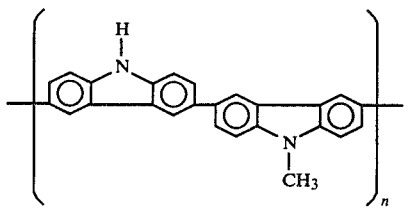

III where R is H and where n is an integer, have been successfully prepared by the one-step method of chemical synthesis. Also, iodine-doped poly(N-methyl 3,3'-carbazolyl), a polymer with the above structure (II), has been similarly prepared. Other iodine-doped conducting polymers of as yet unknown molecular structures have been similarly prepared.

In accordance with the present invention when carbazole monomers represented by (I) are mixed singly, or in pairs, with iodine in a vessel and heated to melt the solid mixtures to form a homogeneous solution, the monomers spontaneously polymerize in air or inert or evacuated atmosphere to form a high molecular weight solid material which is simultaneously doped by iodine. No other solvent or catalyst or initiator is essential to the synthesis. The ability to effect polymerization of carbazole and its derivatives and simultaneously dope in liquid iodine is probably due to many factors acting favorably together, including: the monomers (I) are good electron donors; iodine is a good electron acceptor that may form charge transfer complexes with the polymers and/or monomers; iodine is a good solvent for the monomers; liquid iodine is a highly polarizable solvent which ionizes mostly as $2I_2 = I^+ + I_3^-$.

The as-synthesized conducting polymers are uniformly doped amorphous materials with conductivity in the range $10^{-4}$ to 1/ohm-cm depending on the initial monomer and the degree of polymerization and doping achieved. The kinetics of polymerization and doping in turn depend on the reaction temperature and atmosphere. At a suitable temperature at which polymerization and doping is carried out in liquid iodine, the degree of polymerization and doping achieved depend on the duration of the reaction. Furthermore, the electrical, mechanical and other properties of the as-synthesized doped polymers are conveniently regulated by varying the polymerization and doping reaction conditions of temperature, time, atmosphere, and concentration of reactants. The method of the present invention thus enables the preparation of iodine-doped electrically conducting polymers from suitable monomers in one step.

DESCRIPTION OF THE PREFERRED EMBODIMENTS

In carrying out the one-step method of preparing electrically conducting polymers in accordance with the present invention, the starting monomers are mixed with iodine to form a liquid solution in the temperature range 80°–200° C. in a vessel open to air or sealed from air in inert gas or evacuated atmosphere. Simultaneous polymerization and doping is effected by holding the solution at a temperature in that range and for sufficient time while stirring. The concentration of the initial solution as measured by the starting molar ratios of all monomers to iodine should preferably be no more than 1.00.

In carrying out the method of the present invention for producing iodine-doped polycarbazoles the starting monomers are listed in Table 1. Homopolymers may be produced by using a single starting monomer or a pair of them. Co-polymers may be produced by employing two monomers differing in the N-alkyl group or polymerization sites, for example, the pairs of monomers A and D or B and E.

TABLE 1

CARBAZOLE MONOMERS

| Groups | Monomer | |
|---|---|---|
| R = H, x = y = H | Carbazole (CZ) | A |
| R = H, x = Br, y = H | 3,3'-Dibromcarbazole (DBCZ) | B |
| R = CH, x = y = H | N=Methyl Carbazole (NMCZ) | C |
| R = CH, x = Br, y = H | N—methyl 3,3'-Dibromo-carbazole (NMDBCZ) | D |
| R = H, x = H, y = Br | 2,2'-Dibromocarbazole (2,2' DBCZ) | E |
| R = CH, x = H, y = Br | N—methyl 2,2'-Dibromo-carbazole (2,2' NMDBCZ) | F |

One preferred procedure is to partially fill a vessel with the powdered monomer or monomers. Solid iodine is added and mixed with the monomer(s). The vessel is then heated to the desired temperature in the range 80°–200° C. As the mixture completely melts to form a homogeneous solution stirring is initiated by a mechanical stirrer, magnetic stirrer, or manually with a stirring rod. The viscosity of the solution at this point is either close to or a few times to at most about an order of magnitude greater than that of the pure liquid iodine which is about 0.5727 mm$^2$/s at 116° C., depending on the initial concentration. Onset of rapid polymerization and doping is evidenced by the increasing viscosity and a gaseous product evolved. The kinetics of polymerization and doping may thus be followed conveniently by the amount of gas evolution or by the rapidly increasing viscosity of the polymerizing solution which may increase by several orders of magnitude within a short time (minutes). After the desired level of polymerization and doping is achieved the heat source is removed and polymerization may be stopped by quenching with distilled water, inert organic solvents such as methanol or ethanol, or aqueous solutions such as sodium thiosulfate solutions.

The as-synthesized doped conducting polymers are repeatedly washed with suitable inert solvents or solutions to extract any excess iodine. Alcohols and sodium thiosulfate solutions extracts excess iodine from solid samples readily. The polymer complexes can also be rid of excess iodine by warming gradually to 40°–70° C. and allowing iodine to diffuse out of the samples. Samples washed with liquids are conveniently dried to rid them of the liquids and any residual iodine by drying in a vacuum oven at low temperatures (less than 50° C.)

Films, fibers, or other shapes may be produced directly from the doped molten polymer. Films are produced by casting onto substrates such as glass, alumina, or metallic aluminum. Fibers are drawn directly from the melt as soon as the viscosity is high enough or by removing the source of heat and cooling to high viscosity liquids. Other shapes are conveniently obtained by molding techniques using the as-synthesized doped molten polymer. Depending on the extent of polymerization iodine-doped polymer complexes are also completely or partially sobule in solvents such as acetone, DMF, THF, and nitrobenzene or melt processible to films, fibers, or other shapes.

Another procedure is to mix the requisite monomer or monomers and iodine crystals thoroughly by grinding them together and placing the mixture in a vessel. The vessel is then immersed in a constant temperature bath. The reactant may be exposed to air, to flowing inert gas, or the vessel may be evacuated and sealed. In the first two cases stirring may be by mechanical or manual means, while in the latter it must be by mechanical means. The polymerization is carried out at constant temperature. When the desired degree of polymerization is reached the reaction is quenched as described above.

In another procedure the mixture of iodine and the chosen monomer or monomers is placed in a shallow vessel of large surface area compared with the volume of the reactants. The mixture is spread uniformly over the base of the vessel. The vessel is then heated to the desired temperature or placed in an environment, such as an oven, already at the desired temperature. The reaction is allowed to proceed until the desired level of polymerization is achieved. A doped conducting polymer film may be produced directly by this procedure.

The preferred initial concentration of the monomer or monomers in the mixture described above is in the range of 1 to 60% by weight. Concentrations on either side of this range may also be used, however. Highly concentrated reactant mixtures, in which the molar ratio of the monomer or monomers to iodine exceeds 1.0, usually result in poor yields of the desired polymer and in incomplete doping. Furthermore the reaction kinetics are faster with lower concentrations of the monomer or monomers.

Although, as stated above, doped conducting polymers may be produced in a one step process in air, flowing inert gas, or in a sealed evacuated chamber, the former two are preferable. The reaction kinetics are faster in those atmospheres than in a sealed low pressure environment. Some monomers, particularly carbazole and dihalo-carbazole, polymerize at much slower rates in evacuated vessels.

The invention is further illustrated by the following examples wherein the monomers listed in Table 1 are simultaneously polymerized and doped to yield iodine-doped conducting polymers which exhibit electrical conductivity in the range characteristic of semiconductors. The invention is not limited to these examples.

EXAMPLE 1

Carbazole (CZ) (50 g) was suspended in carbon disulfide (CS$_2$) (473 ml) and heated till reflux. To this warm suspension being stirred magnetically was added (dropwise) a solution of 34 ml (0.658 mole) Br$_2$ in 130 ml CS$_2$. HBr gas was given off very rapidly. Slow addition of bromine solution was used to control the rate of gas evolution. Uon completion of Br$_2$ solution addition heating of the reaction solution was stopped and the stirring continued for several hours. The precipitate formed was collected on a glass filter and washed several times with CS$_2$ to yield white crystals of 3,6 dibromocarbazole (DBCZ). The yield was 67 g (0.206 mole) or 70% of the theoretical. The yield can be improved by cooling the reaction solution prior to filtration and by washing with cold CS$_2$. However, this may increase the chances of co-precipitation of monobromocarbazole if present in the reaction solution. The melting point was 211.5° C. compared to 211°–213° C. literature value.

Sixty grams (60 g) of CZ was placed in a 1000 ml reaction flask to which 90 ml dimethyl sulfate and 300 ml Acetone (gold label) was added. The mechanical stirrer was turned on to 200 rpm. After 5 minutes of stirring 60 g NaOH pellets was added to the reaction mixture, followed by dropwise addition of 100 ml of distilled water until completion and a salt layer could be seen. The stirring rate was increased from 200 rpm to 400 rpm for 3 minutes and then back to 200 rpm. The reaction vessel temperature was increased from 25° C. to 56° C. and refluxed for 1 hr and then cooled 40 minutes. The reaction mixture was poured into 3 liters of cold distilled water precipitating white crystals of N-methylcarbazole (NMCZ). The product was collected, dissolved in acetone and recrystallized in one liter of distilled water. The NMCZ product was dried in a vacuum oven at 80 C. overnight. The yield was 61.9 g or 95.2%; the melting point was 87.4° C. compared with literature value of 88° C.

Thirty grams (30 g) of DBCZ was dissolved in 150 ml acetone/30 ml dimethyl sulfate $(CH_3)_2 SO_4$. Next, 30 g NaOH pellets was added to the reaction solution. Distilled water was dripped slowly into the reaction flask with stirring until a salt layer could be seen. The flask was shaken vigorously for several minutes and then the solution was brought to reflux by heating for 15 minutes after which is was allowed to cool. After 0.5 hr of cooling the reaction solution was poured into cold water, rapidly precipitating white crystals of 3,6-dibromo-N-methyl-carbazole (NMDBCZ). The precipitate was recrystallized from ethanol to give quantitative yields. The melting point was 159° C. compared to 158°–160° C. previously reported.

Five grams (5 g) (0.03 mole) CZ and 9.75 g (0.03 mole) DBCZ were placed in 250 ml beaker. To this was added 18 g (0.07 mole) sublimed iodine crystals. The solids were thoroughly mixed with a glass stirring rod. The beaker was placed on a hot plate and heated to 130° C. while stirring. A violet-blush to black colored solution of low viscosity was obtained. With continuous stirring, a fuming gas evolution was observed with a few seconds of complete dissolution of solids. Within the next few minutes the solution viscosity begin increasing continuously. After 10 minutes long black fibers could be drawn from the high viscosity melt of doped polymer. At about 15 minutes of dissolution some of the doped polymer melt was withdrawn and poured into a beaker of distilled water. Films were cast from the remaining solid product by withdrawing portions onto 2 inch square ceramic alumina substrates maintained at about 50° C. on a hot plate. The remaining product in the reaction vessel was cooled in air. The three fractions were repeatedly washed with methanol or aqueous $Na_2S_2O_3$ and subsequently dried in a vacuum oven at 45° C.

Electrical conductivity measurements on the three fractions using standard 4-point probe, 2-point contact, and in the case of films also by a contactless technique indicated conductivity close to 0.1 to 1/ohm-cm. The polymer backbone structure was judged to be poly(3,3'-carbazolyl) from the close resemblance of the infrared spectrum with that of the pure carbazole monomer and considerations of both the mechanism of polymerization reaction and the gaseous product. Gas absorption infrared spectroscopy showed HBr to be a major component of the gas. Though HI was not observed in the infrared spectra its presence cannot be ruled out because of the extremely high resolution usually required to detect the gas even at long path lengths and high pressure.

EXAMPLE 2

The procedure was similar to Example 1 except that 1 g (0.0055 mole) NMCZ, 1.883 g (0.0055 mole) NMDBCZ, and 4.20 g (0.0166 mole) $I_2$ was used. The molar ratio of monomers to iodine was 0.667 or 40.7% wt monomer's solution in liquid iodine at dissolution.

The polymer backbone structure was determined to be poly(N-methyl 3,3'-carbazolyl) The room temperature dc conductivity was between 0.15 and 2.5/ohm-cm.

EXAMPLE 3

The procedure was similar to Example 1 except that 1 g NMCZ, 1.79 g DBCZ, and 4.20 g $I_2$ was used. The molar ratio of monomers to iodine was 0.667 or 39.9% wt monomer's solution in liquid iodine at dissolution. The polymer backbone structure was determined to be the co-polymer poly(3,3'-carbazolyl-co-N-methyl 3,3'-carbazolyl). The dc conductivity at room temperature was about $10^{-3}$/ohm-cm.

EXAMPLE 4

Ten (10) mixtures of iodine and the chosen monomer or monomers were prepared using single monomers or pairs of monomers as shown in TABLE 2. In those cases where pairs of monomers were used, equimolar mixtures were employed. In each case, whether a single monomer or a pair of monomers was used, the monomer or monomers formed fifteen percent, by weight, of the mixture with iodine. Polymerization of the mixtures was performed either in a beaker or a watch glass by heating the vessel on a hot plate to a temperature in the range of 120° to 125° C. The vessel was held at that temperature for 10 to 15 minutes and then removed from the hot plate. Films or pressed pellets were made from the doped conducting polymers thus produced. D.C. conductivity measurements at room temperature performed on these samples revealed conductivities in the range $10^{-4}$ to 2.5/ohm-cm as shown in TABLE 2.

TABLE 2

| Polymerization and Doping in Liquid Iodine | | | |
|---|---|---|---|
| Monomers(s) | Gas Evolved | Polymer Structure | $\sigma(25° C.)$ $(ohm^{-1}cm^{-1})$ |
| CZ | other | unknown | $\sim 10^{-4}$ |
| DBCZ | HBr, other | poly(3,3'-carbazolyl) (PCZ) | 1–2.5 |
| NMCZ | other | unknown | $\sim 10^{-4}$ |
| NMDBCZ | HBr, other | polyl(N—methyl 3,3'-carbazolyl) (PNMCZ) | 0.15–2.5 |
| CZ, DBCZ | HBr, other | PCZ | 0.1–1.0 |
| CZ, NMCZ | other | unknown | $\sim 10^{-4}$–$10^{-3}$ |
| CZ, NMDBCZ | HBr, other | poly(3,3'-carbazolyl-N—methyl-carbazolyl) | $5 \times 10^{-3}$ |
| DBCZ, NMCZ | HBr, other | poly(3,3'-carbazolyl-N—methyl carbazolyl | $\sim 10^{-3}$ |
| DBCZ, NMDBCZ | HBr, other | poly(3,3'-carbazolyl-N—methyl carbazolyl) | $\sim 10^{-3}$ |
| NMCZ, NMDBCZ | HBr, other | PNMCZ | $\sim 1$ |

The gas evolved during polymerization of the mixtures of iodine and the monomer or monomers and the solid polymer complexes were studied by Fourier Transform Infrared (FTIR) spectroscopy in order to gain knowledge of the mechanism of polymerization and structure of the polymers. A special FTIR gas absorption cell was constructed of pyrex glass. Two KCL windows were attached to provide a path length of 12.70 cm. New 30 to 50% wt mixtures of monomers with iodine were prepared and placed in the cells which were subsequently evacuated and sealed. FTIR spectra in the range 400 to 4000/cm were taken before heating the samples, after heating to 120° to 25° C. for 5 minutes, and after opening the cells. Also films were cast on KCL windows from the solid reaction products and their FTIR spectra taken. HBr gas with bands in the range 2400 to 2800/cm was clearly identified in polymerizing mixtures containing dibromo-monomers. The spectra of one or two other gases were revealed but have as yet not been positively identified. However, HI which was suspected to be present was not revealed by FTIR, perhaps because the sensitivity, path length, and concentration were not high enough for detection.

Thermal analysis of mixtures of iodine and the monomer or monomers and iodine-doped polycarbazoles synthesized by simultaneous polymerization and doping was carried out by differential scanning calorimetry (DSC) and thermogravimetric analysis (TGA) using a DuPont 990 Thermal Analyzer equipped with a 951 TGA and a 910 DSC units. Measurements were made in a nitrogen atmosphere at a heating rate of 10° C./min and from 25° to 300° C. or 600° on the DSC and from 25° to 50° C. on the TGA. The DSC data revealed a Tg in the range of 90°–164° C. and a melting temperature in the range 156°–200° C. for the various samples of iodine-doped polycarbazoles. Muliple exothermic peaks occurring at temperatures in the range 52°–114° C. were also observed and interpreted as due to both loss of some iodine species and further polymerization reactions. The TGA data revealed onset of weight loss in the temperature range 52°–95° C. followed by 48–64% weight loss up to about 300° C. Thereafter constant weight was maintained up to 500°–600° C. after which thermal decomposition of the polymer complexes followed. The TGA results are consistent with the DSC data suggesting further polymerization and loss of volatiles on heating.

The embodiments of the invention in which an exclusive property or right is claimed are defined as follows:

1. A one-step process for making solid electrically conducting organic polymers comprising the steps of:
combining an amount of a monomer selected from a group consisting of N-alkyl carbazole and N-alkyldihalocarbazole monomers or combination thereof of the general formula

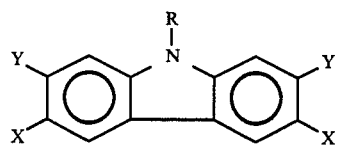

where
R is H or $CH_3$, X is H and both Y's are Br or I, or Y is H and both X's are Br or I, with an amount of $I_2$ wherein said $I_2$ functions as a charge transfer acceptor dopant and heating said combination to form a liquid melt solution thereof; wherein the concentration of said monomers in said melt solution is in the range of 1% to 60% by weight and wherein the concentration of said $I_2$ is from about 99% to 40% by weight;
polymerizing and chemically doping the monomer in said melt solution at a temperature between 80° C. and 200° for a time sufficient to produce the degree of polymerization desired at the temperature selected using an atmosphere selected from inert gas, air, or a partial vacuum.

2. The process of claim 1 wherein said N-alkyl carbazole is one selected from the group consisting of carbazole and N-methyl carbazole and wherein said N-alkyl-dihalocarbazole is one wherein R is H or $CH_3$, Y is H and X is Br.

3. The process of claim 1 wherein said n-alkyl carbazole is one selected from the group consisting of carbazole and N-methyl carbazole and wherein said N-alkyl-dihalocarbazole is one wherein R is H or $CH_3$, Y is H and X is $I_2$.

4. The process of claim 1 wherein said electrically conducting polymer is a copolymer.

5. The process of claim 2 wherein said electrically conducting polymer is a copolymer.

6. The process of claim 3 wherein said electrically conducting polymer is a copolymer.

7. The process of claim 1 wherein said electrically conducting polymer is a homopolymer.

8. The process of claim 2 wherein said electrically conducting polymer is a homopolymer.

9. The process of claim 3 wherein said electrically conducting polymer is a homopolymer.

10. The process of claim 1 wherein said heating takes place in an air atmosphere.

11. The process of claim 1 wherein said heating takes place in an atmosphere of inert gas.

12. The process of claim 1 wherein said mixture is heated and polymerized on a substrate such that a film of said polymer is formed on the substrate.

13. The process of claim 1 further comprising the step of drawing fibers of the electrically conducting polymer directly from said melt.

* * * * *

UNITED STATES PATENT AND TRADEMARK OFFICE
CERTIFICATE OF CORRECTION

PATENT NO. : 4,568,482

DATED : Feb. 4, 1986

INVENTOR(S) : SAMSON A. JENEKHE, ET AL

It is certified that error appears in the above-identified patent and that said Letters Patent is hereby corrected as shown below:

On the cover page, next to "Appl. No.", delete "505,202",
and substitute --525,762--.

Signed and Sealed this

Twenty-seventh Day of May 1986

[SEAL]

Attest:

DONALD J. QUIGG

Attesting Officer

Commissioner of Patents and Trademarks